Aug. 4, 1970
D. R. WILSON
3,522,731
FLUID FLOW RATE DETECTOR
Filed March 4, 1968
2 Sheets-Sheet 1
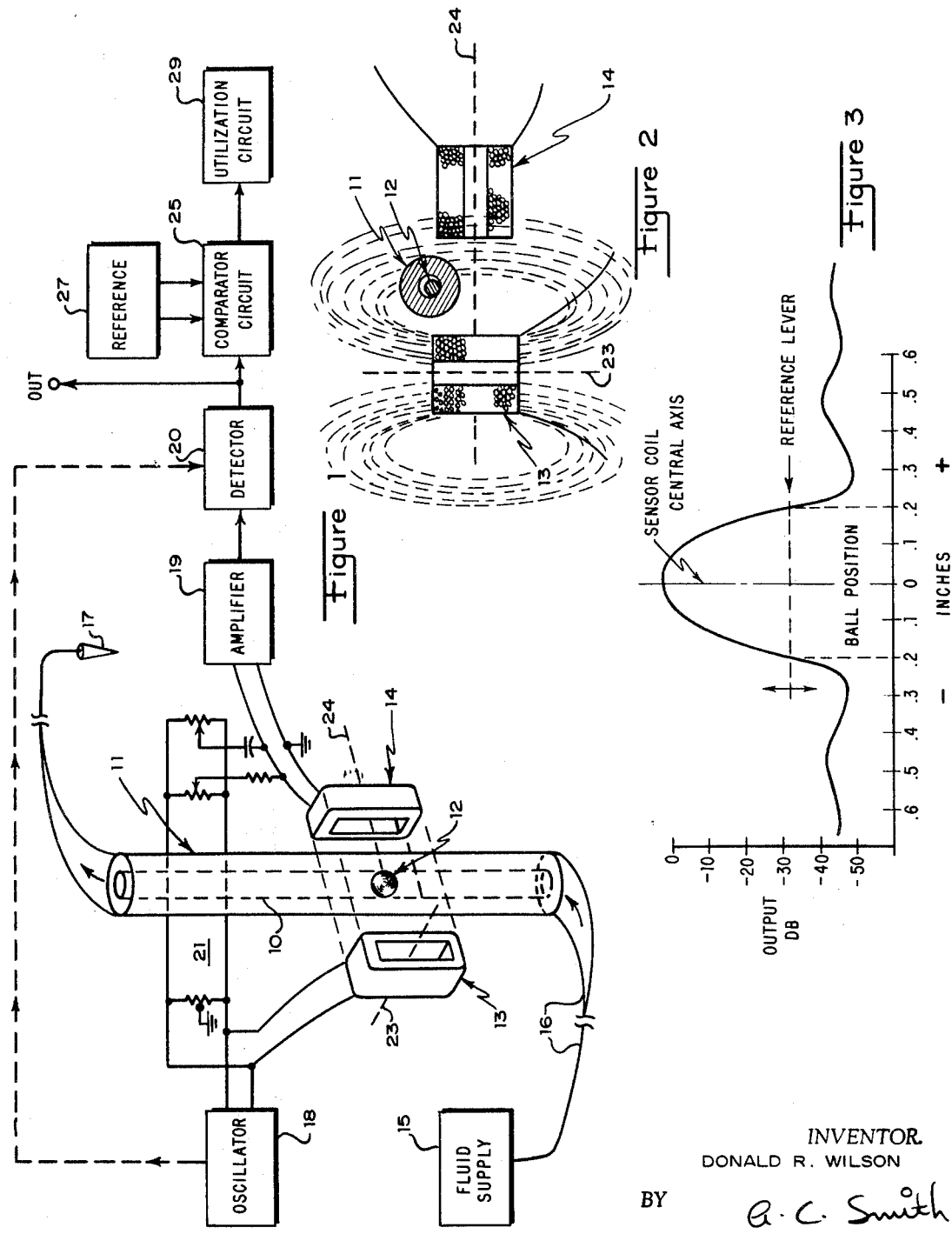
INVENTOR.
DONALD R. WILSON
BY  *A. C. Smith*
ATTORNEY Aug. 4, 1970     D. R. WILSON     3,522,731
FLUID FLOW RATE DETECTOR
Filed March 4, 1968     2 Sheets-Sheet 2
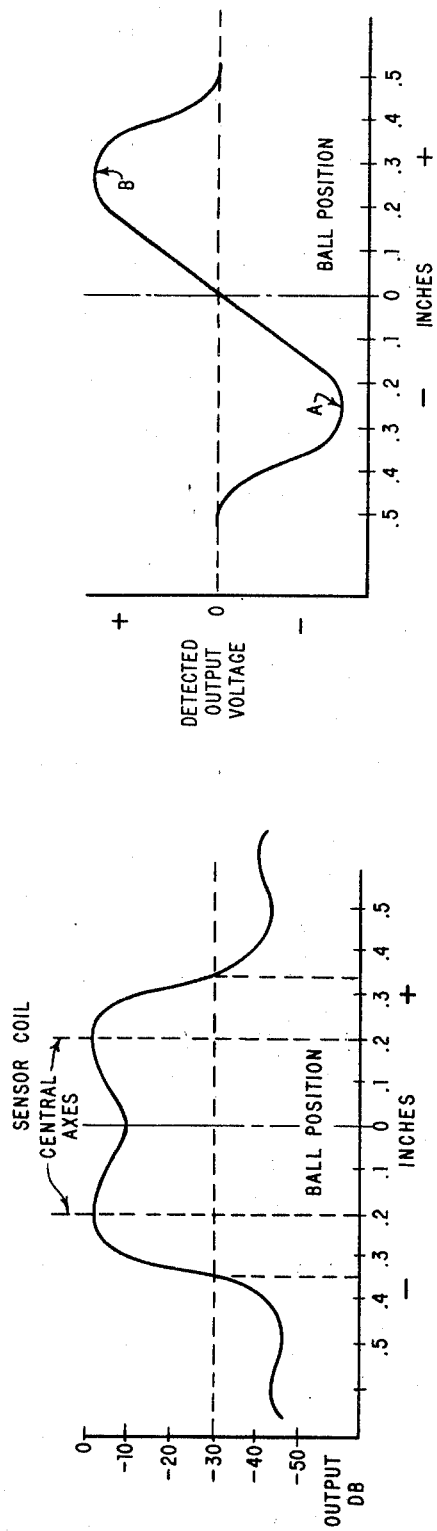
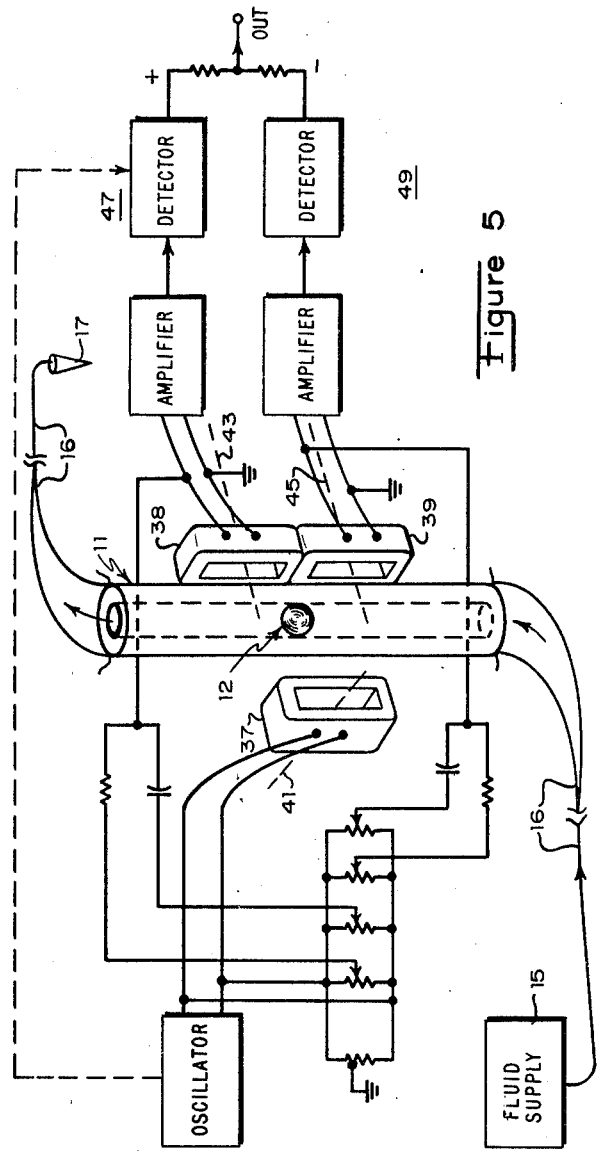
INVENTOR.
DONALD R. WILSON
BY *A. C. Smith*
ATTORNEY

United States Patent Office 3,522,731
Patented Aug. 4, 1970

3,522,731
FLUID FLOW RATE DETECTOR
Donald R. Wilson, Santa Cruz, Calif., assignor to Pacific Plantronics, Inc., Santa Cruz, Calif., a corporation of California
Filed Mar. 4, 1968, Ser. No. 715,117
Int. Cl. G01f 1/00
U.S. Cl. 73—209                                                             2 Claims

ABSTRACT OF THE DISCLOSURE

An electronic fluid flow rate detector includes a conductive object disposed in the flow stream of fluid and positioned asymmetrically in a locally-generated magnetic field for providing an indication of fluid flow rate in response to the detected position of the object within the magnetic field.

SUMMARY OF THE INVENTION

The present invention provides an indication of the position of a flow-supported metallic object within a tapered fluid flow-through gage by sensing the disturbance of a locally-generated magnetic field produced by the metal object. Driver and sensor coils are arranged in selected embodiments of the present invention to produce an output in response to the metallic object, and hence the fluid flow, being above or below predetermined limits.

DESCRIPTION OF THE DRAWING

FIG. 1 is a schematic representation of the fluid flow monitoring apparatus according to one embodiment of the present invention;

FIG. 2 is a top view of the apparatus of FIG. 1;

FIG. 3 is a graph showing the response of the apparatus of FIG. 1 to position of the flow indicator;

FIG. 4 is a graph showing the response of apparatus including a plurality of sensor coils positioned along the gage;

FIG. 5 is a schematic representation of the fluid flow monitoring apparatus according to another embodiment of the present invention; and FIG. 6 is a graph showing the response of the graph of FIG. 4 to position of the flow indicator.

DESCRIPTION OF THE PREFERRED EMBODIMENT

Referring now to the schematic of FIG. 1, there is shown a fluid flow rate gage 11 of non-magnetic, non-conductive material such as glass having an internal bore 10 which tapers divergently from bottom to top in the direction of fluid flow therethrough. A flow-rate indicator sphere 12, preferably of magnetic material such as stainless steel, is constrained to move substantially vertically against gravity within the bore 10 in response to the rate of fluid flow therethrough. Fluid flows in conduit 16 from a fluid supply 15 such as a bottle of blood plasma or other intravenous liquid upwardly through the gage 11 to a fluid outlet 17 such as an infusion needle, or the like.

As is commonly known in flow-rate gages of this type, the sphere 12 attains a vertical position related to the rate of fluid flow through the gage 11. This gage, which may form part of a presterilized, disposable fluid infusion set for intravenous, intra-arterial or subcutaneous administration of fluids, is removably positioned adjacent a pair of electromagnetic coils 13 and 14. As shown in the top view of FIG. 2, the gage 11 is vertically disposed out of alignment with the intersecting central or magnetic axes of symmetry of the coils 13 and 14 in one of the two closely adjacent quadrants defined by the coil axes. These coils 13 and 14 are arranged substantially at right angles to each other to eliminate magnetic coupling between them under conditions of uniform magnetic field normally produced by driver coil 13. This coil 13 receives an electrical signal from local oscillator 18 at a frequency of about 100 kilohertz and produces a magnetic field along magnetic axis 23 which couples to the magnetic sphere 12 and to the sensor coil 14. The output of sensor coil 14 is applied through amplifier 19 to the detector 20. In the absence of the sphere 12 within the magnetic field produced around coil 13, there should be no local oscillator signal from oscillator 18 present on the coil 14. Any signal that may be present is due to coil misalignment and capacitive coupling between the coils and may be eliminated by the balancing network 21 which is also connected to receive the signal from the oscillator 18. This network includes a pair of potentiometers connected to receive the oscillator signal and to apply adjustable amounts of out-of-phase or reactive signal and in-phase or real signal to amplifier 19 to cancel any undesirable imbalance signal present on coil 14.

In operation, a presterilized gage 11 as part of an infusion set may be conveniently snapped into position with respect to the coils 13 and 14, as shown in FIGS. 1 and 2. The gage 11 is offset from the magnetic axes 23, 24 to assure adequate magnetic coupling between the coils 13 and 14 due to distorted magnetic field when the ball or sphere 12 is near the axes 23, 24. When the ball 12 is not in the detector area (i.e. within the region of the coils 13 and 14), the output of coil 14 due to any misalignment or capacitive coupling is balanced out to zero signal using the adjustment potentiometers in the balancing network 21. As fluid flow increases and the ball 12 is elevated into the detection area within the gage 11, the magnetic field from the driver coil 13 is distorted about the magnetic material of the ball 12. This field distortion upsets the balance condition of zero signal from coil 14 previously established by the balancing network 21 and produces an output from coil 14 representative of the position of the ball relative to the axes 23, 24 of the coils 13 and 14, respectively. The maximum electrical output from coil 14 occurs for a fluid flow rate which elevates the ball 12 to a position at these central axes 23, 24 and the output from coil 14 decreases as the fluid flow rate positions the ball 12 above or below the central axes 23, 24. The signal from coil 14 is applied to amplifier 19 and the amplified signal is applied to detector 20. The output of amplifier 19 and the response of the apparatus for fluid flow rates which position the ball 12 near the axes 23, 24 is shown in FIG. 3 where the driver and sensor coils are about .5 inch long by .1 inch wide and .1 inch high, spaced about .2 inch apart. The ball 12 is typically about .062 inch in diameter, grade #440 stainless steel located within gage 11 which is off center from axes 23, 24 by about .082 inch. Of course, the ball 12 need not be made of magnetic material but may merely be conductive material which, capable of conducting induced eddy currents, may also distort the magnetic field about driver coil 13 to provide magnetic coupling to sensor coil 14. A conductive, non-magnetic ball 12 is found to provide only about ten percent of the output amplitude response provided by a ball 12 of magnetic material.

The detector 20 may be any convenient type such as a synchronous, peak, or average detector, or the like, for applying to a comparator circuit 25 an output signal which is related to the amplitude of signal received from sensor coil 14. The comparator circuit also receives a variable reference signal 27 for providing selected upper and lower limits of signal detection and, hence, fluid flow rates through the gage 11. The comparator circuit 25 thus supplies an output to a suitable utilization circuit 29 such as an alarm device, or the like, for indicating the presence of fluid flow at a rate above or below the selected limit.

Since the response curve of the apparatus, as shown in FIG. 3, is substantially symmetrical for ball positions about the central axes 23, 24, the position of the gage 11 may be adjusted relative to the coils 13 and 14 to set the center of the desired range of flow rate and the reference signal 27 may then be adjusted to set the upper and lower limits of fluid flow rate. Of course, a detector 20 which operates in synchronism with signal from oscillator 18 may also be used to provide signals of different polarity for positions of the ball 12 on opposite sides of the central axes 23, 24. Such signals may then be compared independently with different reference levels, thereby eliminating the need for mechanical adjustment of the coils 13 and 14 along the gage 11 for providing indications of flow rate exceeding independently adjustable upper and lower limits. For wider dynamic range of flow rates using a gage 11 of given internal bore taper, at least the sensor coil 14 may be made longer along the length of the gage 11. Additionally, two or more sensor coils, and optionally a corresponding number of driving coils, may be arranged end to end along the gage 11 with the coil outputs combined additively to yield an output, as shown in the graph of FIG. 4.

In the embodiment of the invention shown schematically in FIG. 5 a pair of sensor coils 38 and 39 are disposed end to end along the length of gage 11 and a single driver coil 37 is positioned along the gage 11 with the coil axis 41 disposed intermediate the coil axes 43 and 45 of the coils 38 and 39, respectively. The coils 37, 38 and 39 are arranged in misalignment with respect to gage 11 as previously described in connection with FIG. 2. The two sensor channels 47 and 49, each with a balancing network as previously described, are then combined in polarity opposition to provide an output response with varying ball position and, hence, with varying fluid flow rate, as shown in the graph of FIG. 6. The combined output may then be supplied to a suitable indicator for providing an accurate indication of the actual fluid flow rate over a range of flow rate values and, hence, ball positions, for which the graph of FIG. 6 is a monotonically increasing curve (e.g. from A to B). Such a combined output may, of course, also be supplied to a suitable comparator circuit for comparison with independently adjustable upper and lower reference values to provide an alarm output when flow rate exceeds the preset upper or lower limits.

What is claimed is:
1. Detection apparatus for measuring a selected physical parameter, the apparatus comprising:
an unmagnetized metallic element substantially vertically within a divergingly tapered bore of an elongated body of non-conductive, non-magnetic material;
a supply of fluid connected to said body to supply a flow of fluid upwardly through said tapered bore, said element attaining a position along said bore which is representative of the flow rate of fluid therethrough;
a conductor forming a first magnetic coil having a magnetic axis which is substantially normal to the path of movement of said element;
at least a second magnetic coil including a conductor and having a magnetic axis which is substantially normal to the magnetic axis of said first coil and to said path of movement of said element;
a signal source connected to apply alternating signal to the conductor of said first coil for producing an alternating magnetic field in the region of said path and said second coil, said second coil being oriented within said alternating field to have substantially zero alternating signal induced therein by said alternating magnetic field in the absence of said element within said field; and
circuit means connected to the conductor of said second coil for producing an output representative of the value of said selected physical parameter in response to the position of said element along said path and within said alternating magnetic field.

2. Apparatus as in claim 1 comprising:
a third magnetic coil including a conductor and having a magnetic axis which is substantially parallel to the magnetic axis of the second coil and which is spaced therefrom in a direction along said path, the axes of said second and third coils being substantially equally spaced from said path;
the magnetic axis of said first coil is disposed along said path intermediate the magnetic axes of said second and third coils; and
said circuit means produces an output representative of the position of said element along said path as the combination of signals from the conductors of said second and third magnetic coils.

References Cited

UNITED STATES PATENTS

| | | | |
|---|---|---|---|
| 2,715,705 | 8/1955 | Barstow et al. | 73—209 XR |
| 3,128,625 | 4/1964 | Heineman | 73—209 |
| 3,140,606 | 7/1964 | Kramer et al. | 73—205 |

RICHARD C. QUEISSER, Primary Examiner

J. K. LUNSFORD, Assistant Examiner

UNITED STATES PATENT OFFICE
CERTIFICATE OF CORRECTION

Patent No. 3,522,731          Dated August 4, 1970

Inventor(s) Donald R. Wilson

It is certified that error appears in the above-identified patent and that said Letters Patent are hereby corrected as shown below:

Column 3, line 50, after "element" insert -- constrained to move --;

Column 4, line 33, before "axes" insert -- magnetic --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents